(12) United States Patent
Bischinger

(10) Patent No.: US 11,381,562 B2
(45) Date of Patent: Jul. 5, 2022

(54) DETECTION OF A USER EQUIPMENT TYPE RELATED TO ACCESS, SERVICES AUTHORIZATION AND/OR AUTHENTICATION

(71) Applicant: DEUTSCHE TELEKOM AG, Bonn (DE)

(72) Inventor: Kurt Bischinger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 372 days.

(21) Appl. No.: 16/479,932

(22) PCT Filed: Jan. 9, 2018

(86) PCT No.: PCT/EP2018/050411
§ 371 (c)(1),
(2) Date: Jul. 23, 2019

(87) PCT Pub. No.: WO2018/141510
PCT Pub. Date: Aug. 9, 2018

(65) Prior Publication Data
US 2019/0386991 A1    Dec. 19, 2019

(30) Foreign Application Priority Data
Feb. 2, 2017   (EP) .................................... 17154413

(51) Int. Cl.
*H04L 29/06*      (2006.01)
*H04W 12/06*      (2021.01)
(Continued)

(52) U.S. Cl.
CPC ...... *H04L 63/0892* (2013.01); *H04L 63/0876* (2013.01); *H04W 4/60* (2018.02);
(Continued)

(58) Field of Classification Search
CPC ....... H04W 12/08; H04W 12/40; H04W 4/70; H04W 8/04; H04W 4/60; H04W 76/10;
(Continued)

(56) References Cited

U.S. PATENT DOCUMENTS 10,091,194 B2 * 10/2018 Votaw ..................... G06F 21/42
10,547,498 B1 *  1/2020 Garner, IV ........... H04L 67/303
(Continued)

FOREIGN PATENT DOCUMENTS

| CN | 101990280 A | 3/2011 |
| CN | 102695165 A | 9/2012 |
| CN | 103181142 A | 6/2013 |

*Primary Examiner* — Haresh N Patel
(74) *Attorney, Agent, or Firm* — Leydig, Voit & Mayer, Ltd.

(57) ABSTRACT

A method for detection of a user equipment type includes: receiving, by a communication network, a service request message from a user equipment, wherein the service request message requests a service from the communication network and comprises subscriber identity information and/or device identity information related to the user equipment and an indication that an alternative authorization method and/or an alternative authentication method is to be applied to the user equipment; verifying, by the communication network, based on the subscriber identity information and/or the device identity information related to the user equipment, that the user equipment belongs to an internet-of-things user equipment type; and in response to verifying that the user equipment belongs to the internet-of-things user equipment type, granting, by the communication network, the requested service to the user equipment.

14 Claims, 1 Drawing Sheet

(51) Int. Cl.
  *H04W 12/08* (2021.01)
  *H04L 9/40* (2022.01)
  *H04W 4/60* (2018.01)
  *H04W 4/70* (2018.01)
  *H04W 76/10* (2018.01)
  *H04W 8/18* (2009.01)
  *H04W 12/40* (2021.01)

(52) U.S. Cl.
  CPC ............... *H04W 4/70* (2018.02); *H04W 8/18* (2013.01); *H04W 12/06* (2013.01); *H04W 12/08* (2013.01); *H04W 12/40* (2021.01); *H04W 76/10* (2018.02)

(58) Field of Classification Search
  CPC ...... H04W 8/18; H04W 12/06; H04L 67/303; H04L 63/0876; H04L 63/0892
  USPC ............................................................ 726/4
  See application file for complete search history.

(56) References Cited

U.S. PATENT DOCUMENTS

| | | | |
|---|---|---|---|
| 2010/0057485 A1 | 3/2010 | Luft | |
| 2013/0170347 A1 | 7/2013 | Zhang et al. | |
| 2013/0344861 A1 | 12/2013 | Brisebois et al. | |
| 2014/0094139 A1 | 4/2014 | Xu et al. | |
| 2015/0237216 A1 | 8/2015 | Gonzalez et al. | |
| 2016/0337322 A1* | 11/2016 | Kang | H04L 63/08 |
| 2017/0180380 A1* | 6/2017 | Bagasra | H04L 63/10 |
| 2017/0213220 A1* | 7/2017 | Tomlinson, Jr. | H04L 63/08 |
| 2017/0257367 A1* | 9/2017 | Han | H04L 63/205 |
| 2017/0359237 A1* | 12/2017 | Hao | H04W 12/069 |
| 2018/0062847 A1* | 3/2018 | Mildh | H04L 9/0643 |
| 2018/0189514 A1* | 7/2018 | Yocam | G06F 21/6245 |
| 2019/0268384 A1* | 8/2019 | Hu | H04L 63/20 |

* cited by examiner

DETECTION OF A USER EQUIPMENT TYPE RELATED TO ACCESS, SERVICES AUTHORIZATION AND/OR AUTHENTICATION

CROSS-REFERENCE TO PRIOR APPLICATIONS

This application is a U.S. National Phase Application under 35 U.S.C. § 371 of International Application No. PCT/EP2018/050411, filed on Jan. 9, 2018, and claims benefit to European Patent Application No. EP 17154413.3, filed on Feb. 2, 2017. The International Application was published in English on Aug. 9, 2018 as WO 2018/141510 A1 under PCT Article 21(2).

FIELD

The present invention relates to a method for enhanced detection of a user equipment type being related to a user equipment requesting access to and/or services from a communication network and/or for applying an alternative authorization method and/or an alternative authentication method to a user equipment requesting access to and/or services from a communication network in case of the user equipment belonging to an internet-of-things user equipment type, wherein the communication network comprises a core network and an access network, and wherein the communication network is able to serve user equipments of different user equipment types, applying different authorization methods and/or different authentication methods for different user equipments belonging to different user equipment types.

Furthermore, the present invention relates to a communication network for enhanced detection of a user equipment type being related to a user equipment requesting access to and/or services from a communication network and/or for applying an alternative authorization method and/or an alternative authentication method to a user equipment requesting access to and/or services from a communication network in case of the user equipment belonging to an internet-of-things user equipment type, wherein the communication network comprises a core network and an access network, and wherein the communication network is able to serve user equipments of different user equipment types, applying different authorization methods and/or different authentication methods for different user equipments belonging to different user equipment types.

Furthermore, the present invention relates to a program comprising a computer readable program code which, when executed on a computer or on a network node of a communication network, such as a subscriber repository functionality and/or an access network element and/or a core network element, causes the computer or the network node of the communication network to perform a method according to the present invention.

The present invention also relates to a computer program product for enhanced detection of a user equipment type being related to a user equipment requesting access to and/or services from a communication network and/or for applying an alternative authorization method and/or an alternative authentication method to a user equipment requesting access to and/or services from a communication network, the computer program product comprising a computer program stored on a storage medium, the computer program comprising program code which, when executed on a computer or on a network node of a communication network, such as a subscriber repository functionality and/or an access network element and/or a core network element, causes the computer or the network node of the communication network to perform a method according to the present invention.

BACKGROUND

Within communication networks, it is possible that distinct functionalities or services shall only be offered to special user equipments or types of user equipments. For example, in modern generations of mobile communication networks, it is possible that a distinct service is only supposed to be accessible to internet-of-things user equipment types but not accessible to other types of user equipments. Such a service can be, e.g., loading subscription data and credentials to an internet-of-things user equipment from the access network, which can enable switching of the network operator without physically exchanging the subscriber identity module in the internet-of-things user equipment.

SUMMARY

In an exemplary embodiment, the invention provides a method for detection of a user equipment type. The method comprises: receiving, by an access network element of an access network of a communication network or a core network element of a core network of the communication network, a service request message from a user equipment, wherein the communication network is configured to apply different authorization methods and/or different authentication methods for different types of user equipments, wherein the core network of the communication network comprises a subscriber repository functionality comprising subscriber identity information and/or device identity information regarding a plurality of user equipments of different user equipment types, and wherein the service request message requests a service from the communication network and comprises subscriber identity information and/or device identity information related to the user equipment and an indication that an alternative authorization method and/or an alternative authentication method is to be applied to the user equipment; verifying, by the communication network, based on the subscriber identity information and/or the device identity information related to the user equipment, that the user equipment belongs to an internet-of-things user equipment type; and in response to verifying that the user equipment belongs to the internet-of-things user equipment type, granting, by the communication network, the requested service to the user equipment via a service authorization message being sent to the user equipment from the access network element or the core network element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
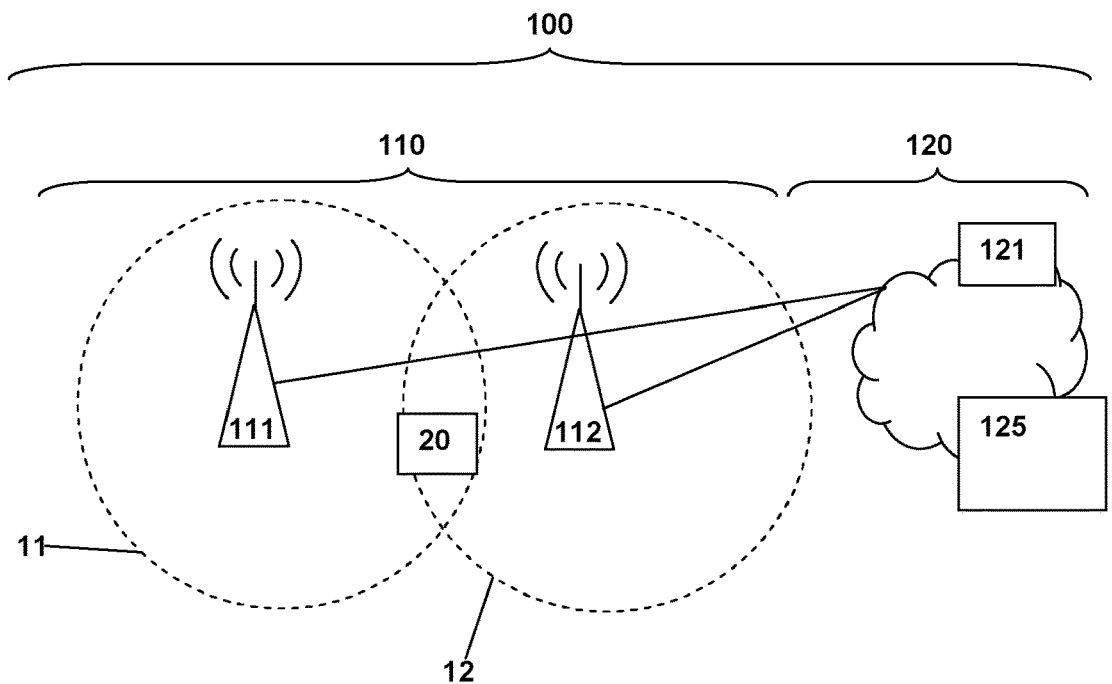
FIG. 1 schematically illustrates a communication network according to an embodiment of the present invention.

Exemplary embodiments of the present invention improve and simplify a method for detection of a user equipment type being related to a user equipment requesting access to and/or services from a communication network and/or for applying an alternative authorization method and/or an alternative authentication method to a user equipment requesting access to and/or services from a communication network.

In an exemplary embodiment, the present invention provides a method for enhanced detection of a user equipment type being related to a user equipment requesting access to and/or services from a communication network and/or for applying an alternative authorization method and/or an alternative authentication method to a user equipment requesting access to and/or services from a communication network in case of the user equipment belonging to an internet-of-things user equipment type, wherein the communication network comprises a core network and an access network, and wherein the communication network is able to serve user equipments of different user equipment types, applying different authorization methods and/or different authentication methods for different user equipments belonging to different user equipment types, wherein the user equipment is related to a subscriber identity information and/or to a device identity information, wherein the communication network comprises, as part of the core network, a subscriber repository functionality, the subscriber repository functionality comprising pieces of subscriber identity information and/or pieces of device identity information regarding a plurality of user equipments of different user equipment types, wherein the method comprises the following steps:

in a first step, the user equipment requests a service from the communication network via transmitting a service request message to an access network element or a core network element, the service request message comprising the subscriber identity information and/or the device identity information related to the user equipment and/or an indication that the alternative authorization method and/or the alternative authentication method shall be applied to the user equipment, in a second step, subsequent to the first step—in case that the user equipment belongs to an internet-of-things user equipment type—, the requested service is granted to the user equipment via the user equipment receiving a service authorization message from the access network element or the core network element, wherein, prior to the second step, the communication network performs—based on the subscriber identity information and/or the device identity information—a verification that the user equipment indeed belongs to the internet-of-things user equipment type.

It is therefore advantageously possible according to the present invention that the type (or category) of a user equipment can be identified by the communication network in a reliable, easy and advantageous manner, e.g., in view of checking whether the user equipment is entitled to access a requested service and/or authentication and/or authorization method that only a particular type (or category) of user equipments are allowed to access. Therein, the user equipment can transmit a service request message to a network element of the communication network (an access network element or a core network element), the service request message comprising the subscriber identity information and/or the device identity information related to the user equipment and an indication that the alternative authorization method and/or the alternative authentication method shall be applied to the user equipment. It is thus possible that the communication network can identify/check based on the subscriber identity information and/or the device identity information (related to the user equipment) whether the user equipment belongs to a certain type of user equipments (e.g., the internet-of-thing user equipment type). In case the user equipment belongs to the internet-of-things user equipment type, it is accordingly possible that a requested service is granted to the user equipment. It is advantageously possible according to exemplary embodiments of inventive method that the type of a user equipment (e.g., internet-of-things user equipment type) can be identified by the communication network (or a suitable entity thereof like a subscriber repository functionality, home subscriber server, home location register etc.), in particular based on a combination of parameters (subscriber identity information and/or device identity information related to the user equipment). Exemplary embodiments of the inventive method can thereby improve processes for granting access to certain services within communication networks (such as within modern mobile communication networks (5G)) for particular types or kinds of user equipments. For example, it is thereby possible that only internet-of-things user equipment type user equipments are granted access to certain services or functionalities (e.g., obtaining subscription data and credentials from the communication network or alternative authentication methods, e.g., in the field of industrial automation) that are not accessible to other types of user equipments (e.g., for security reasons or capability reasons).

Deciding whether or not to grant a user equipment access to distinct services (only) based on hardware features of the user equipment is less useful because the hardware features within a type of user equipments (e.g., within the internet-of-things user equipment type user equipments) can be too diverse and overlap with other types of user equipments.

According to a preferred embodiment of the present invention, the verification that the user equipment indeed belongs to the internet-of-things user equipment type is performed by the subscriber repository functionality of the communication network upon at least one further request message transmitted by the access network element or by the core network element to the subscriber repository functionality, wherein at least one further authorization message is transmitted by the subscriber repository functionality to the access network element or to the core network element, wherein the at least one further authorization message comprises an indication that the user equipment belongs to the internet-of-things user equipment type.

Thereby, it is advantageously possible according to an embodiment of the present invention that the access network element or core network element can be, e.g., a base station entity, policy enforcement point, visitor location register, mobility management entity or any other network entity that can be involved in handling requests for authentication or authorization or granting authorization within a communication network. By indicating to the access network element or the core network element whether (and in particular that) the requesting user equipment is an internet-of-things user equipment type, the access network element or the core network element can allow the user equipment to use (or prohibit the user equipment from using) a service (if the service is only supposed to be accessible to internet-of-things user equipment type user equipments). Accordingly, it is possible that the access network element or the core network element can block or allow a service requested by the user equipment (e.g., a connection to a distinct server (IP address, URL etc.)). Furthermore, it is advantageously possible that the employed protocols (employed for the communication between entities of the communication network or between an entity of the communication network and a user equipment) are configured to have the capability of comprising an information on the type of a user equipment (e.g., whether the user equipment is or is not of an internet-of-things user equipment type).

According to an embodiment of the present invention, in the second step, the requested service is denied to the user equipment in case that the user equipment does not belong to an internet-of-things user equipment type.

According to an embodiment of the present invention, —in addition to the subscriber identity information and/or the device identity information being related to the user equipment—an additional information element is stored in the subscriber repository functionality, wherein the additional information element comprises the information whether the user equipment belongs to an internet-of-things user equipment type or not.

It is therefore possible according to an embodiment of the present invention that an additional information element is stored in the subscriber repository functionality, the additional element indicating whether the user equipment is of an internet-of-thing user equipment type or not. It is possible that the subscriber repository functionality generates this additional information element from the subscriber identity information and/or the device identity information related to the user equipment. It is also possible that it is known to the subscriber repository functionality (e.g., from a previous service request by the user equipment and a previous transmission of the subscriber identity information and/or the device identity information to the subscriber repository function) whether the user equipment belongs to an internet-of-things user equipment type or not.

According to an embodiment of the present invention, the at least one further authorization message transmits the additional information element that the user equipment indeed belongs to the internet-of-things user equipment type, wherein, for example, an information regarding the user equipment belonging to the internet-of-things user equipment type is stored within the access network element or within the core network element.

According to an embodiment of the present invention, the information regarding the user equipment belonging to the internet-of-things user equipment type—stored within the access network element or within the core network element—is used in case that the access network element or the core network element receives, in a third step subsequent to the second step, a subsequent service request message from the user equipment and/or related to the subscriber identity information and/or the device identity information related to the user equipment, wherein the subsequent service request message comprises the indication that the alternative authorization method and/or the alternative authentication method shall be applied.

Thereby, it is advantageously possible according to an embodiment of the present invention that it is known to the access network element or the core network element (e.g., from a previously sent message from the subscriber repository functionality to the access network element or the core network element as part of a previous iteration of an embodiment of the inventive method) whether the user equipment belongs to an internet-of-things user equipment type or not. Thus, it is advantageously possible that the access network element or the core network element grants or denies the requested service to/from the user equipment without the need of consulting the subscriber repository functionality because the type of the user equipment is already known to the access network element or the core network element (e.g. from a previous iteration of an embodiment of the inventive method, in particular in case at least one further authorization message has been transmitted by the subscriber repository functionality to the access network element or to the core network element before). Thereby, it is possible to facilitate requests of a service from the communication network by the user equipment, in particular in case at least one further authorization message has been transmitted by the subscriber repository functionality to the access network element or to the core network element before the request of the user equipment regarding a service from the communication network via transmitting a service request message to an access network element or a core network element.

According to an embodiment of the present invention, the information—as part of the at least one further authorization message and/or the information content of the additional information element—whether the user equipment belongs to the internet-of-things user equipment type or not is derived either solely by the respective subscriber identity information of the user equipment or solely by the respective device identity information or by a combination of both the subscriber identity information and the device identity information of the user equipment.

According to an embodiment of the present invention, it is possible that the device identity information comprises an International Mobile Station Equipment Identity (IMEI) and/or that the subscriber identity information comprises an International Mobile Subscriber Identity (IMSI).

In an exemplary embodiment, the present invention provides a communication network for enhanced detection of a user equipment type being related to a user equipment requesting access to and/or services from a communication network and/or for applying an alternative authorization method and/or an alternative authentication method to a user equipment requesting access to and/or services from a communication network in case of the user equipment belonging to an internet-of-things user equipment type, wherein the communication network comprises a core network and an access network, and wherein the communication network is able to serve user equipments of different user equipment types, applying different authorization methods and/or different authentication methods for different user equipments belonging to different user equipment types, wherein the user equipment is related to a subscriber identity information and/or to a device identity information, wherein the communication network comprises, as part of the core network, a subscriber repository functionality, the subscriber repository functionality comprising pieces of subscriber identity information and/or pieces of device identity information regarding a plurality of user equipments of different user equipment types, wherein the communication network is configured such that:

the communication network receives a service request from the user equipment via receiving, by an access network element or by a core network element, a service request message, the service request message comprising the subscriber identity information and/or the device identity information related to the user equipment and/or an indication that the alternative authorization method and/or the alternative authentication method shall be applied to the user equipment, the requested service is granted—in case that the user equipment belongs to an internet-of-things user equipment type—to the user equipment via the communication network transmitting, for example from the access network element or the core network element, a service authorization message to the user equipment, wherein, the communication network performs—based on the subscriber identity information and/or the device identity information—a verification that the user equipment indeed belongs to the internet-of-things user equipment type.

It is therefore advantageously possible according to the present invention that the type (or category) of a user equipment can be identified by the communication network in a reliable, easy and advantageous manner, e.g., in view of checking whether the user equipment is entitled to access a requested service and/or authentication and/or authorization method that only a particular type (or category) of user equipments are allowed to access. Therein, the user equipment can transmit a service request message to a network element of the communication network (an access network element or a core network element), the service request message comprising the subscriber identity information and/or the device identity information related to the user equipment and an indication that the alternative authorization method and/or the alternative authentication method shall be applied to the user equipment. It is thus possible that the communication network can identify/check based on the subscriber identity information and/or the device identity information (related to the user equipment) whether the user equipment belongs to a certain type of user equipments (e.g., the internet-of-thing user equipment type). In case the user equipment belongs to the internet-of-things user equipment type, it is accordingly possible that a requested service is granted to the user equipment. It is advantageously possible according to exemplary embodiments of the inventive method that the type of a user equipment (e.g., internet-of-things user equipment type) can be identified by the communication network (or a suitable entity thereof like a subscriber repository functionality, home subscriber server, home location register etc.), in particular based on a combination of parameters (subscriber identity information and/or device identity information related to the user equipment). Exemplary embodiments of the inventive method can thereby improve processes for granting access to certain services within communication networks (such as within modern mobile communication networks (5G) for particular types or kinds of user equipments. For example, it is thereby possible that only internet-of-things user equipment type user equipments are granted access to certain services or functionalities (e.g., obtaining subscription data and credentials from the communication network or alternative authentication methods, e.g., in the field of industrial automation) that are not accessible to other types of user equipments (e.g., for security reasons or capability reasons).

According to an embodiment of the present invention, the communication network is configured such that the verification that the user equipment indeed belongs to the internet-of-things user equipment type is performed by the subscriber repository functionality of the communication network upon at least one further request message transmitted by the access network element or by the core network element to the subscriber repository functionality, wherein at least one further authorization message is transmitted by the subscriber repository functionality to the access network element or to the core network element, wherein the at least one further authorization message comprises an indication that the user equipment belongs to the internet-of-things user equipment type.

According to an embodiment of the present invention, —in addition to the subscriber identity information and/or the device identity information being related to the user equipment—an additional information element is stored in the subscriber repository functionality, wherein the additional information element comprises the information whether the user equipment belongs to an internet-of-things user equipment type or not.

Furthermore, in an exemplary embodiment, the present invention provides a program comprising a computer readable program code which, when executed on a computer or on a network node of a communication network, such as a subscriber repository functionality and/or an access network element and/or a core network element, causes the computer or the network node of the communication network to perform a method according to an embodiment of the present invention.

Furthermore, in an exemplary embodiment, the present invention provides a computer program product for enhanced detection of a user equipment type being related to a user equipment requesting access to and/or services from a communication network and/or for applying an alternative authorization method and/or an alternative authentication method to a user equipment requesting access to and/or services from a communication network, the computer program product comprising a computer program stored on a storage medium, the computer program comprising program code which, when executed on a computer or on a network node of a communication network, such as a subscriber repository functionality and/or an access network element and/or a core network element, causes the computer or the network node of the communication network to perform a method according to an embodiment of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a communication network 100 (in this case a mobile communication network) comprising a core network 120 and an access network 110 is schematically illustrated. The access network 110 comprises an access network element 111 (e.g., a base station entity), wherein the access network 111 element serves a radio cell 11. Typically, the access network 110 comprises further access network elements 112, which serve further radio cells 12. A user equipment 20 can communicate with an access network element 111 and can accordingly communicate with the entities within the communication network 100. The core network 120 comprises a subscriber repository functionality 125 and optionally a core network element 121.

Figure 2:
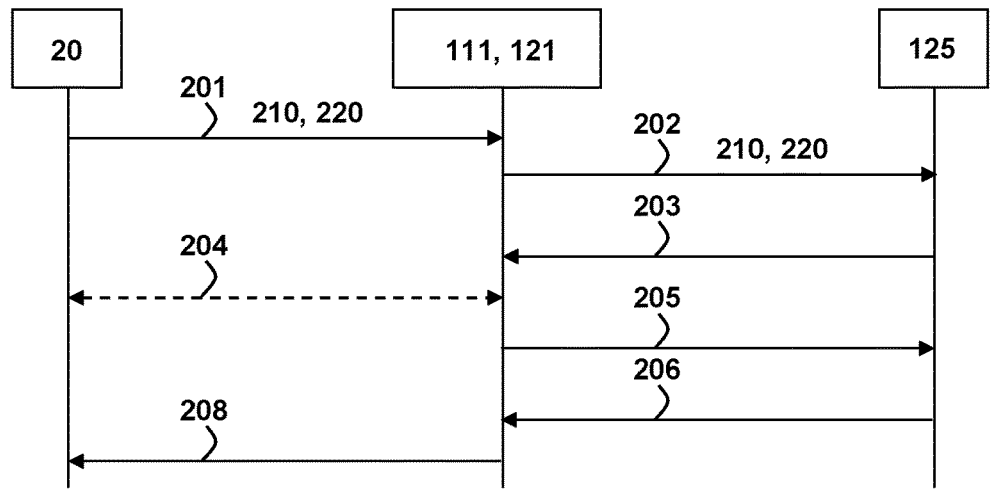
FIG. 2 schematically illustrates a communication diagram according to an embodiment of the present invention.

In FIG. 2, a communication diagram according to an embodiment of the present invention is schematically illustrated. As part of a first step, the user equipment 20 requests a service (and/or access authentication) from the communication network 100 via transmitting a service request message 201 to an access network element 111 or a core network element 121 (potentially via an access network element 111 to a core element 121). As part of the service request message 201, the subscriber identity information 210 and/or the device identity information 220 of the user equipment 20 and/or an indication that the alternative authorization method and/or the alternative authentication method shall be applied to the user equipment 20 (or that the alternative authorization method and/or the alternative authentication method are requested by the user equipment 20) are transmitted. The alternative authorization method and/or the alternative authentication method are in particular methods which are only allowed (or accessible) for certain types of user equipments 20, e.g., internet-of-things user equipment types. A further request message 202, 205 is sent from the access network element 111 or the core network element 121 to a subscriber repository functionality 125, typically after reception of the service request message 201 (for example, in case that it is not known to the access network element 111 or the core network element 121, whether the requesting user equipment 20 belongs to an internet-of-things user equipment type). It is possible that the further request message 202, 205 corresponds to a request of the user equipment 20, requesting access to and/or services from a communication network 100 and/or for applying an alternative authorization method and/or an alternative authentication method to a user equipment 20 requesting access to and/or services from a communication network 100. It is preferred that the further request message 202, 205 comprises the subscriber identity information 210 and/or the device identity information 220 of the user equipment 20. After reception of the further request message 202, 205 by the subscriber repository functionality 125, the subscriber repository functionality 125 (or an entity that has access to the subscriber repository functionality 125) verifies whether the user equipment 20 indeed belongs to the internet-of-things user equipment type. Preferably (e.g., after the verification by the subscriber repository functionality 125) an additional information element 230 is stored in the subscriber repository functionality 125, wherein the additional information element 230 comprises the information whether the user equipment 20 belongs to an internet-of-things user equipment type or not.

In case that the further request message 202 corresponds to a request of the user equipment 20, requesting access to a communication network 100 and/or for applying an alternative authentication method to the user equipment 20, after the verification, a further authentication message 203 is transmitted by the subscriber repository functionality 125 to the access network element 111 or to the core network element 121, wherein the further authentication message 203 comprises an indication that the user equipment 20 belongs to the internet-of-things user equipment type (or alternatively that the user equipment does not belong to the internet-of-things user equipment type). If the further authentication message 203 indicates that the user equipment 20 indeed belongs to the internet-of-things user equipment type, further authentication information exchange 204 between the access network element 111 or the core network element 121 and the user equipment 20 occurs. Afterward, it is preferred that the access network element 111 or the core network element 121 sends a further request message 205, preferably indicating the successful authentication of the user equipment 20, to the subscriber repository functionality 125.

In case that the further request message further request message 205 corresponds to a request of the user equipment 20, requesting a service from the communication network 100 and/or for applying an alternative authorization method to the user equipment 20, after the verification, a further authorization message 206 is transmitted by the subscriber repository functionality 125 to the access network element 111 or to the core network element 121, wherein the at least one further authorization message 206 comprises an indication (e.g., the additional information element 230) that the user equipment 20 belongs to the internet-of-things user equipment type (or alternatively that the user equipment does not belong to the internet-of-things user equipment type). In case that the user equipment 20 belongs to an internet-of-things user equipment type, the requested service is granted to the user equipment 20 via the user equipment 20 receiving a service authorization message 208 from the access network element 111 or the core network element 121. In case the user equipment does not belong to the internet-of-things user equipment type that is allowed to user the requested service, the user equipment is denied from using the requested service.

According to an alternative embodiment of the present invention and in case that it is already known to the access network element 111 or to the core network element 121 from a previous authentication message 203 or previous further authorization message 206 (e.g., from a previous authentication message 203 or previous further authorization message 206 that was sent to the access network element 111 or to the core network element 121 from the subscriber repository functionality 125 before the current service request message 201 is sent to the access network element 111 or to the core network element 121), it is preferred that the access network element 111 or the core network element 121—after the reception of the service request message 201—sends the service authorization message 208 to the user equipment 20 (at least in case that the user equipment 20 belongs to the internet-of-things user equipment type) preferably without sending a further request message 202, 205 to the subscriber repository functionality 125.

Figure 3:
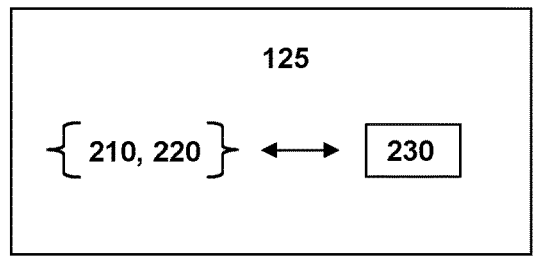
FIG. 3 schematically illustrates generation of an additional information element according to an embodiment of the present invention.

In FIG. 3, generation of an additional information element 230 according to an embodiment of the present invention is schematically illustrated. Preferably the additional information element 230, indicating whether the user equipment 20 belongs to the internet-of-things user equipment type or not, is derived either solely from the respective subscriber identity information 210 of the user equipment 20 or solely from the respective device identity information 220 or form a combination of both the subscriber identity information 210 and the device identity information 220 of the user equipment 20. The generation/creation of the additional information element 230 is performed by the subscriber repository functionality 125 or by a network entity associated to the subscriber repository functionality 125. The generation of the additional information element 230 is preferably carried out upon receipt (by subscriber repository functionality 125) of the at least one further request message 202, 205.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for detection of a user equipment type, wherein the method comprises:
    receiving, by an access network element of an access network of a communication network or a core network element of a core network of the communication network, a service request message from a user equipment, wherein the communication network is configured to apply different authorization methods and/or different authentication methods for different types of user equipments, wherein the core network of the communication network comprises a subscriber repository functionality comprising subscriber identity information and/or device identity information regarding a plurality of user equipments of different user equipment types, and wherein the service request message requests a service from the communication network and comprises subscriber identity information and/or device identity information related to the user equipment and an indication that an alternative authorization method and/or an alternative authentication method is to be applied to the user equipment;
    verifying, by the subscriber repository functionality, based on the subscriber identity information and/or the device identity information related to the user equipment, that the user equipment belongs to an internet-of-things user equipment type upon at least one further request message being transmitted by the access network element or by the core network element to the subscriber repository functionality;
    transmitting, by the subscriber repository functionality, at least one further authorization message to the access network element or to the core network element, wherein the at least one further authorization message comprises an indication that the user equipment belongs to the internet-of-things user equipment type; and
    in response to verifying that the user equipment belongs to the internet-of-things user equipment type, granting, by the communication network, the requested service to the user equipment via a service authorization message being sent to the user equipment from the access network element or the core network element.

2. The method according to claim 1, wherein the communication network denies a service request from a further user equipment that does not belong to the internet-of-things user equipment type.

3. The method according to claim 1, wherein the subscriber identity information and/or the device identity information related to the user equipment and an additional information element are stored in the subscriber repository functionality, wherein the additional information element indicates whether or not the user equipment belongs to the internet-of-things user equipment type.

4. The method according to claim 3, wherein the at least one further authorization message transmitted by the subscriber repository functionality to the access network element or to the core network element comprises the additional information element; and
    wherein the access network element or the core network element stores information regarding the user equipment belonging to the internet-of-things user equipment type.

5. The method according to claim 4, wherein the information regarding the user equipment belonging to the internet-of-things user equipment type stored at the access network element or the core network element is used in case the access network element or the core network element receives a subsequent service request message from the user equipment and/or related to the subscriber identity information and/or the device identity information related to the user equipment, wherein the subsequent service request message comprises the indication that the alternative authorization method and/or the alternative authentication method is to be applied.

6. The method according to claim 3, wherein whether or not the user equipment belongs to the internet-of-things user equipment type is derived solely from the subscriber identity information related to the user equipment, solely from the device identity information related to the user equipment, or from a combination of the subscriber identity information and the device identity information related to the user equipment.

7. A communication network for detection of a user equipment type, wherein the communication network comprises:
    a core network; and
    an access network;
    wherein the communication network is configured to serve user equipments of different user equipment types and to apply different authorization methods and/or different authentication methods for different user equipments belonging to different user equipment types;
    wherein the core network comprises a subscriber repository functionality, the subscriber repository functionality comprising subscriber identity information and/or device identity information regarding a plurality of user equipments of different user equipment types;

wherein an access network element of the access network or a core network element of the core network is configured to receive a service request message from a user equipment, wherein the service request message requests a service from the communication network and comprises subscriber identity information and/or device identity information related to the user equipment and an indication that an alternative authorization method and/or an alternative authentication method is to be applied to the user equipment;

wherein the subscriber repository functionality is configured to verify, based on the subscriber identity information and/or the device identity information related to the user equipment, that the user equipment belongs to an internet-of-things user equipment type upon at least one further request message being transmitted by the access network element or by the core network element to the subscriber repository functionality;

wherein the subscriber repository functionality is further configured to transmit at least one further authorization message to the access network element or to the core network element, wherein the at least one further authorization message comprises an indication that the user equipment belongs to the internet-of-things user equipment type; and wherein the communication network is configured to grant, in response to verifying that the user equipment belongs to the internet-of-things user equipment type, the requested service to the user equipment via a service authorization message being sent to the user equipment from the access network element or the core network element.

8. The communications network according to claim 7, wherein the subscriber identity information and/or the device identity information related to the user equipment and an additional information element are stored in the subscriber repository functionality, wherein the additional information element indicates whether or not the user equipment belongs to the internet-of-things user equipment type.

9. One or more non-transitory computer-readable mediums having processor-executable instructions stored thereon for detection of a user equipment type, wherein the processor-executable instructions, when executed, facilitate:

receiving, by an access network element of an access network of a communication network or a core network element of a core network of the communication network, a service request message from a user equipment, wherein the communication network is configured to apply different authorization methods and/or different authentication methods for different types of user equipments, wherein the core network of the communication network comprises a subscriber repository functionality comprising subscriber identity information and/or device identity information regarding a plurality of user equipments of different user equipment types, and wherein the service request message requests a service from the communication network and comprises subscriber identity information and/or device identity information related to the user equipment and an indication that an alternative authorization method and/or the alternative authentication method is to be applied to the user equipment;

verifying, by the subscriber repository functionality, based on the subscriber identity information and/or the device identity information related to the user equipment, that the user equipment belongs to an internet-of-things user equipment type upon at least one further request message being transmitted by the access network element or by the core network element to the subscriber repository functionality;

transmitting, by the subscriber repository functionality, at least one further authorization message to the access network element or to the core network element, wherein the at least one further authorization message comprises an indication that the user equipment belongs to the internet-of-things user equipment type; and in response to verifying that the user equipment belongs to the internet-of-things user equipment type, granting, by the communication network, the requested service to the user equipment via a service authorization message being sent to the user equipment from the access network element or the core network element.

10. The one or more non-transitory computer-readable mediums according to claim 9, wherein the processor-executable instructions, when executed, facilitate: denying, by the communication network, a service request from a further user equipment that does not belong to the internet-of-things user equipment type.

11. The one or more non-transitory computer-readable mediums according to claim 9, wherein the subscriber identity information and/or the device identity information related to the user equipment and an additional information element is stored in the subscriber repository functionality, wherein the additional information element indicates whether or not the user equipment belongs to the internet-of-things user equipment type.

12. The one or more non-transitory computer-readable mediums according to claim 11, wherein the at least one further authorization message transmitted by the subscriber repository functionality to the access network element or to the core network element comprises the additional information element; and wherein the processor-executable instructions, when executed, further facilitate: storing, by the access network element or the core network element, information regarding the user equipment belonging to the internet-of-things user equipment type.

13. The one or more non-transitory computer-readable mediums according to claim 12, wherein the processor-executable instructions, when executed, further facilitate:

using the information regarding the user equipment belonging to the internet-of-things user equipment type stored at the access network element or the core network element in case the access network element or the core network element receives a subsequent service request message from the user equipment and/or related to the subscriber identity information and/or the device identity information related to the user equipment, wherein the subsequent service request message comprises the indication that the alternative authorization method and/or the alternative authentication method is to be applied.

14. The one or more non-transitory computer-readable mediums according to claim 11, wherein the processor-executable instructions, when executed, further facilitate:

deriving whether or not the user equipment belongs to the internet-of-things user equipment type solely from the subscriber identity information related to the user equipment, solely from the device identity information related to the user equipment, or from a combination of the subscriber identity information and the device identity information related to the user equipment.

\* \* \* \* \*